United States Patent
Kesek et al.

(10) Patent No.: US 12,535,099 B2
(45) Date of Patent: *Jan. 27, 2026

(54) PROPELLER SHAFT WITH REINFORCED FRONT FLANGE

(71) Applicant: PRATT & WHITNEY CANADA CORP., Longueuil (CA)

(72) Inventors: Mateusz Kesek, Nagawczyna (PL); Tomasz Rozputynski, Hyżne (PL)

(73) Assignee: PRATT & WHITNEY CANADA CORP., Longueuil (CA)

( * ) Notice: Subject to any disclaimer, the term of this patent is extended or adjusted under 35 U.S.C. 154(b) by 573 days.

This patent is subject to a terminal disclaimer.

(21) Appl. No.: 17/932,762

(22) Filed: Sep. 16, 2022

(65) Prior Publication Data

US 2024/0093721 A1    Mar. 21, 2024

(51) Int. Cl.
*B64D 35/00* (2006.01)
*F16C 3/02* (2006.01)
*F16D 1/076* (2006.01)

(52) U.S. Cl.
CPC ............... *F16C 3/02* (2013.01); *B64D 35/00* (2013.01); *F16D 1/076* (2013.01); *F16C 2240/30* (2013.01); *F16C 2240/70* (2013.01)

(58) Field of Classification Search
CPC .... F16C 3/02; F16C 2240/30; F16C 2240/70; B64D 35/00; F16D 1/076
USPC .......................................... 464/182; 403/337
See application file for complete search history.

(56) References Cited

U.S. PATENT DOCUMENTS

| | | |
|---|---|---|
| 2,828,956 A | 4/1958 | Bieniosek et al. |
| 3,322,200 A | 5/1967 | Tresch |
| 3,585,815 A | 6/1971 | Hubbard |
| 4,406,640 A | 9/1983 | Franklin et al. |
| 4,451,245 A | 5/1984 | Hoernig et al. |
| 4,706,364 A | 11/1987 | Aubry |
| 4,849,152 A | 7/1989 | Rumberger |
| 5,421,781 A | 6/1995 | Mackellar |
| 7,322,180 B2 | 1/2008 | Lapergue et al. |
| 7,874,925 B2 | 1/2011 | Dewhirst |

(Continued)

FOREIGN PATENT DOCUMENTS

| | | |
|---|---|---|
| CA | 3149073 A1 | 8/2022 |
| CN | 110605528 B | 3/2022 |

(Continued)

OTHER PUBLICATIONS

European Search Report issued on Jan. 30, 2024 for corresponding application No. 23197520.2.

*Primary Examiner* — Greg Binda
(74) *Attorney, Agent, or Firm* — NORTON ROSE FULBRIGHT CANADA

(57) ABSTRACT

A propeller shaft assembly for an aircraft engine includes a shaft having a bore extending through the shaft at a front end thereof, the front end of the shaft having an outer surface facing radially outwardly from the shaft and an inner surface spaced apart from the outer surface and facing radially inwardly to the bore. A front flange extends radially outwardly on the outer surface, the front flange defining a hub side surface adapted to abut with a propeller hub. A reinforcement rib extends radially inwardly towards a central axis of the shaft. At least part of the reinforcement rib is radially aligned with the front flange.

23 Claims, 4 Drawing Sheets

(56) References Cited

U.S. PATENT DOCUMENTS

| | | |
|---|---|---|
| 8,161,623 B2 * | 4/2012 | Bachle ................. F16D 3/74 |
| 8,167,727 B2 | 5/2012 | Anema |
| 8,734,017 B1 | 5/2014 | Colson et al. |
| 9,216,495 B2 | 12/2015 | Farineau |
| 11,466,725 B2 | 10/2022 | Pethick et al. |
| 11,994,141 B2 * | 5/2024 | Merritt ............... F04D 29/053 |
| 12,078,211 B2 | 9/2024 | Geislinger et al. |
| 2008/0012329 A1 | 1/2008 | Dewhirst |
| 2014/0179450 A1 | 6/2014 | Chang |
| 2017/0191559 A1 | 7/2017 | Russ |
| 2019/0072080 A1 | 3/2019 | Lemma et al. |
| 2021/0071646 A1 | 3/2021 | Schroer |
| 2022/0112846 A1 | 4/2022 | Dionne |
| 2024/0093720 A1 * | 3/2024 | Kesek ................. B64C 11/02 |
| 2024/0093721 A1 | 3/2024 | Kesek et al. |

FOREIGN PATENT DOCUMENTS

| | | |
|---|---|---|
| DE | 4313296 A1 | 6/1994 |
| DE | 19842821 A1 | 4/2000 |
| EP | 1956187 A2 | 8/2008 |
| EP | 2882962 | 10/2016 |
| EP | 4148290 | 3/2023 |
| FR | 2643686 A1 | 8/1990 |
| KR | 20080036309 A | 4/2008 |
| KR | 20180121173 A | 11/2018 |
| WO | 2013190459 A1 | 12/2013 |

\* cited by examiner

PROPELLER SHAFT WITH REINFORCED FRONT FLANGE

TECHNICAL FIELD

The disclosure relates generally to aircraft engines and, more particularly, to propeller shaft assemblies for such engines.

BACKGROUND

Propeller shafts are subjected to significant bending moments resulting from airplane maneuvers—due to aerodynamic and gyroscopic loads, for instance —, and/or propeller shape or size, amongst other possibilities. During operation of the engine, the front portion of the propeller shaft is an area subjected to high stress amplitudes and concentration caused by cyclic external loads during operation of the engine. The front portion of the propeller shaft about a propeller shaft/hub interface may be exposed to high stress from engine operation and/or service damage during the mounting and the unmounting of the propeller hub to the shaft and/or as the front portion of the shaft is exposed to the environment for engine maintenance. Limiting and/or controlling stress concentration in such area therefore remains a concern for increasing engine safety and extending service life.

SUMMARY

There is accordingly provided a propeller shaft assembly for an aircraft engine, comprising: a shaft having a bore extending through the shaft at a front end thereof, the front end of the shaft having an outer surface facing radially outwardly from the shaft and an inner surface spaced apart from the outer surface and facing radially inwardly to the bore; a front flange extending radially outwardly on the outer surface, the front flange defining a hub side surface and an engine side surface opposite the hub side surface and axially spaced apart therefrom, the hub side surface of the front flange adapted to abut with a propeller hub, the front flange having a base merging with the outer surface of the shaft; and a reinforcement rib extending radially inwardly towards a central axis of the shaft, wherein at least part of the reinforcement rib is radially aligned with the front flange.

The propeller shaft assembly as defined above and described herein may further include one or more of the following features, in whole or in part, and in any combination.

In certain aspects, the reinforcement rib defines a fillet facing inwardly towards the central axis, the fillet located on an engine side of the reinforcement rib opposite a hub side of the reinforcement rib, the front flange defines a fillet facing outwardly away from the central axis, the fillet of the front flange located on an engine side of the front flange opposite a hub side of the front flange.

In certain aspects, the fillet of the reinforcement rib extends axially along the central axis from a front fillet end to a rear fillet end, the rear fillet end axially offset from that of the fillet of the front flange.

In certain aspects, the fillet of the reinforcement rib has a radius $R2$ and the fillet of the front flange has a radius $R1$, a ratio of $R2$ over $R1$ having a value of at least 0.2 and at most 3.0.

In certain aspects, at least part of the fillet of the reinforcement rib is radially aligned with the fillet of the front flange along the central axis.

In certain aspects, the reinforcement rib has an annular surface facing towards the central axis, the annular surface delimiting a central opening of the shaft, the central opening having a diameter $D2$, the bore of the shaft having a maximum diameter $D1$ in a shaft section adjacent the reinforcement rib, the shaft section located on an engine side of the front flange opposite a hub side of the flange, a ratio of $D2$ over $D1$ having a value between 0.1 and 0.9.

In certain aspects, the reinforcement rib has an annular wall having a hub side surface and an engine side surface opposite the hub side surface, an annular surface facing towards the central axis between the hub side surface and the engine side surface of the reinforcement rib, the annular surface delimiting a central opening of the shaft, the engine side surface extending from the central opening, angularly with respect to the central axis.

In certain aspects, the engine side surface of the reinforcement rib extends at an angle $\alpha$ with respect to the central axis, the angle $\alpha$ being at least 10 degrees and at most 90 degrees.

In certain aspects, the engine side surface of the reinforcement rib intersects with a plane containing the engine side surface of the front flange.

In certain aspects, the engine side surface of the reinforcement rib extends axially beyond the engine side surface in a direction extending away from the front end of the shaft along the central axis.

In certain aspects, the reinforcement rib defines an annular front surface facing in a direction opposite that of the engine side surface of the front flange, the annular front surface axially offset from the front end of the shaft along the central axis.

In certain aspects, the annular front surface of the reinforcement rib is axially offset with respect to the hub side surface of the front flange along the central axis, the annular front surface of the reinforcement rib closer from the front end of the shaft than the hub side surface is from the front end of the shaft.

In certain aspects, the annular front surface of the reinforcement rib is axially offset with respect to the hub side surface of the front flange along the central axis, the hub side surface of the front flange closer from the front end of the shaft than the front annular surface of the reinforcement rib is from the front end of the shaft.

In certain aspects, the reinforcement rib extends annularly about the central axis, the reinforcement rib having an annular surface delimiting a central opening of the shaft at the front end of the shaft, the reinforcement rib having a hollowed interior radially between the annular surface and the front flange.

In certain aspects, the propeller hub is removably secured to the front flange, the propeller hub having a flange engaging surface axially engaging the hub side surface of the front flange when secured to the front flange.

There is also provided a propeller shaft for a propeller shaft assembly of an aircraft engine, the propeller shaft having: a bore extending through the shaft from a front end thereof; an annular wall extending about the bore, the annular wall having an outer surface facing radially outwardly from the shaft and an inner surface spaced apart from the outer surface and facing radially inwardly to the bore; a front flange projecting radially outwardly from the outer surface of the annular wall and a reinforcement rib disposed extending radially inwardly from the inner surface of the annular wall, at least part of the reinforcement rib being radially aligned with the front flange; and the front flange defining a hub side surface and an engine side surface opposite the hub side surface and axially spaced apart therefrom, the hub side surface of the front flange defining an interface plane and adapted to abut with a propeller hub.

The propeller shaft assembly as defined above and described herein may further include one or more of the following features, in whole or in part, and in any combination.

In certain aspects, the reinforcement rib defines a fillet facing inwardly towards the central axis, the fillet located on an engine side of the reinforcement rib opposite a hub side of the reinforcement rib, the front flange defines a fillet facing outwardly away from the central axis, the fillet of the front flange located on an engine side of the front flange opposite a hub side of the front flange, the fillet of the reinforcement rib extending axially along the central axis from a front fillet end to a rear fillet end, the rear fillet end axially offset from that of the fillet of the front flange.

In certain aspects, the fillet of the reinforcement rib has a radius R2 and the fillet of the front flange has a radius R1, wherein a ratio of R2 over R1 having a value of at least 0.2 and at most 3.0.

In certain aspects, the reinforcement rib has an annular surface facing towards the central axis, the annular surface delimiting a central opening of the shaft, the central opening having a diameter D2, the bore of the shaft having a maximum diameter D1 in a shaft section adjacent the reinforcement rib, the shaft section located on an engine side of the front flange opposite a hub side of the front flange, a ratio of D2 over D1 having a value between 0.1 and 0.9.

In certain aspects, the reinforcement rib has an annular wall having a hub side surface and an engine side surface opposite the hub side surface, the annular surface interconnecting the hub side surface and the engine side surface of the reinforcement rib, the engine side surface extending from the central opening, angularly at an angle α with respect to the central axis, the angle α being at least 10 degrees and at most 90 degrees.

BRIEF DESCRIPTION OF THE DRAWINGS

Reference is now made to the accompanying figures in which.

DETAILED DESCRIPTION

Figure 1:
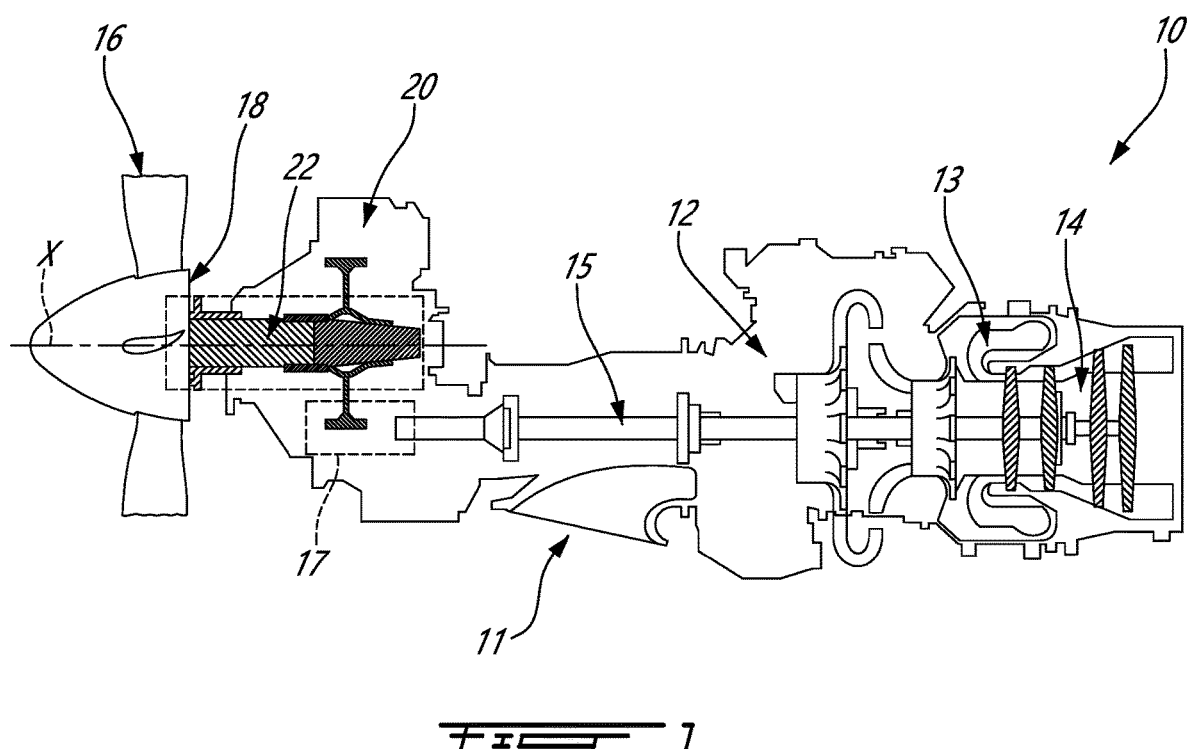
FIG. 1 is a schematic cross sectional view of an aircraft engine having a propeller shaft assembly.

FIG. 1 illustrates an aircraft engine 10 of a type preferably provided for use in subsonic flight, generally comprising in serial flow communication an air intake 11 through which air is drawn, a compressor section 12 within which the air is compressed, a combustor 13 in which the compressed air is mixed with fuel and ignited for generating an annular stream of hot combustion gases, and a turbine section 14 for extracting energy from the combustion gases.

The aircraft engine 10 of FIG. 1 is a turboprop engine, and therefore includes a power output shaft 15 connected to and driven by one or more of the turbines from the turbine section 14 to transmit a driving force to a propeller 16 of the aircraft via a propeller shaft assembly 20, with or without a reduction gearbox 17 between the output shaft 15 and the propeller shaft assembly 20. In some embodiments, the output shaft 15 could be in direct driving engagement with the propeller 16, for example.

The propeller shaft assembly 20 has at least one propeller shaft 22 (or simply, shaft 22). The shaft 22 defines a propeller hub interface adapted to be coupled with a propeller hub 18 of the propeller 16, as further described later. The shaft 22 has a shaft axis X, which may be coextensive with a rotation axis of the propeller 16 in at least some embodiments. Stated otherwise, in at least some embodiments, the propeller 16 may be mounted for rotation about the shaft axis X to the shaft 22. The rotational axis of the propeller 16 and the shaft axis X could be non-coextensive in other embodiments.

Figure 2A:
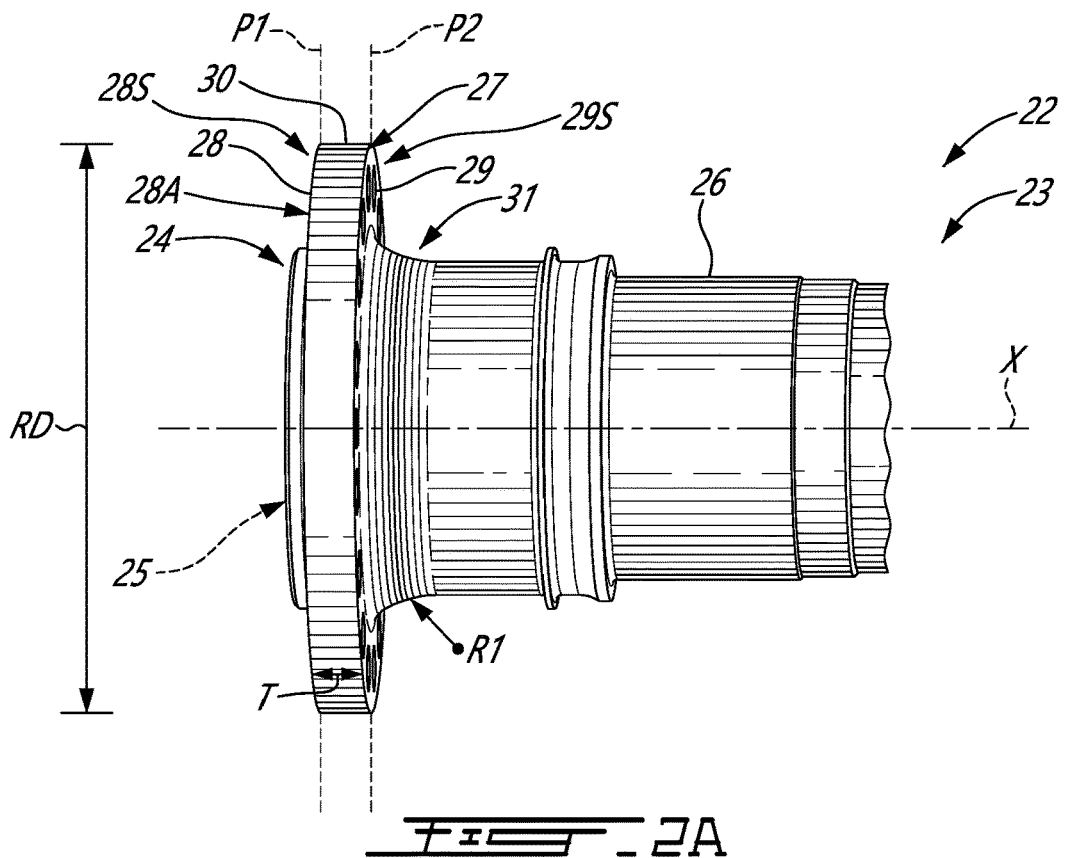
FIG. 2A is a longitudinal view of a portion of a shaft of the propeller shaft assembly of the aircraft engine of FIG. 1.
Figure 2B:
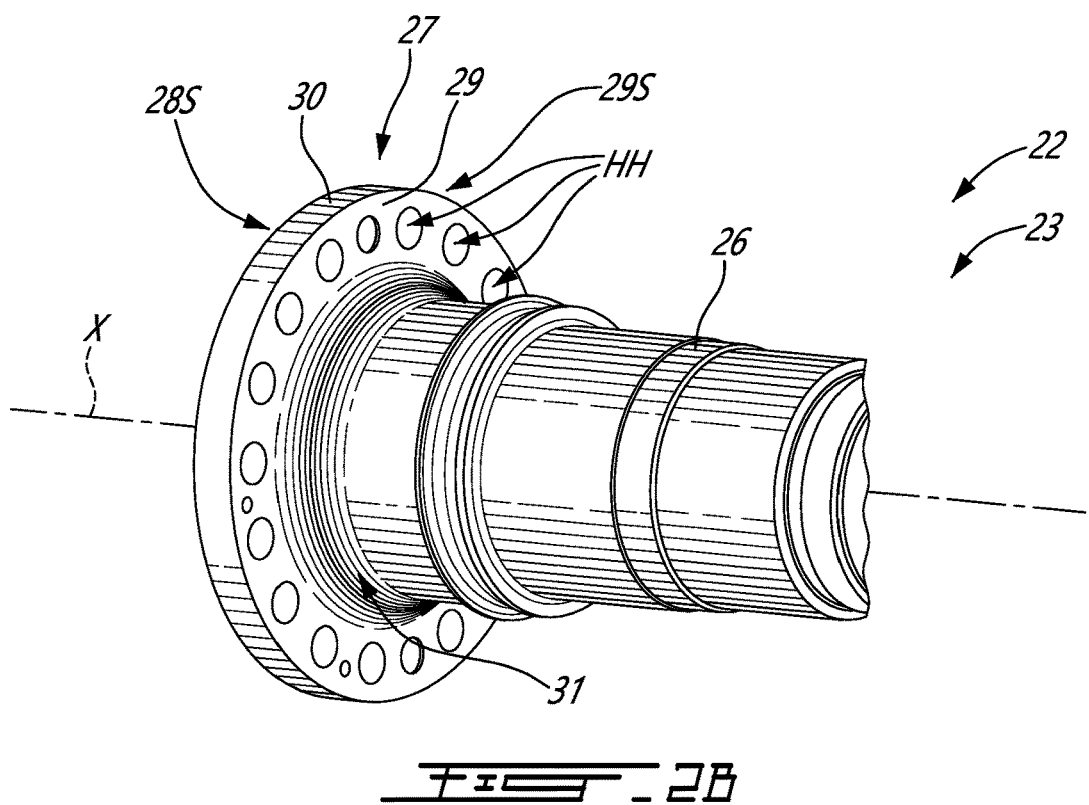
FIG. 2B is perspective view of the portion of the shaft of FIG. 2A.

Other aspects of the propeller shaft assembly 20 are now described with reference to FIGS. 2A-2B, which show a front end portion 23 of the shaft 22. As shown, the shaft 22 has a front end 24. The front end 24 is the forwardmost point of the shaft 22, which engages with the propeller 16. The shaft 22 is hollowed at least in the front end portion 23. The shaft 22 has a bore 25, which can be seen in the following figures. The bore 25 extends through the shaft 22 at the front end 24. The bore 25 may serve as a fluid channel for fluid flow communication with the propeller hub 18. Pressurized oil, or other fluid, may be supplied to propeller control systems/units and/or blade actuators, via the bore 25.

The shaft 22 has an outer surface 26 facing radially outwardly from the shaft 22. The outer surface 26 may be supported by bearings (not shown) or other components for rotation of the shaft 22 about the shaft axis X. Seals, rings or other engine components may also interface with the shaft 22 along the outer surface 26.

The shaft 22 has a front flange 27 which extends radially outwardly from the outer surface 26. The front flange 27 is adapted to engage and/or mate with the propeller hub 18, which will be further described later. The front flange 27 has a disc shape and extends circumferentially about the shaft axis X. Other shapes may be contemplated, whether or not extending circumferentially about a full circumference of the shaft 22. For example, the front flange 27 could define separate flange segments extending outwardly from the outer surface 26. The front flange 27 could have a non circular shape, such as an oval shape, square shape, polygonal shape, or have an irregular outline, as some other examples. The front flange 27 defines a hub side surface 28 and an engine side surface 29 axially spaced apart from the hub side surface. 28 The hub side surface 28 and the engine side surface 29 face away from each other, here in opposite directions. The hub side surface 28 defines a hub interface 28A. As further described later, the hub interface 28A may abut against the propeller hub 18 when the front flange 27 is coupled therewith.

In at least some embodiments, the hub side surface 28 and the engine side surface 29 are flat surfaces. As shown, the hub side surface 28 extends in a plane P1 and the engine side surface 29 extends in a plane P2. In the embodiment shown, the planes P1 and P2 are parallel one to another, so are the surfaces 28, 29. The planes P1 and P2 could have a different relative orientation in other embodiments. For example, the planes P1 and P2, and/or the hub side surface 28 and the engine side surface 29 could extend angularly relative to each other. As another example, the hub side surface 28 and/or the engine side surface 29 could have an irregular, convex, concave, or other outlines. The hub side surface 28 and/or the engine side surface 29 could also define ribs, grooves, or keying features, for example.

The front flange 27 has an outer periphery 30 extending between the hub side surface 28 and the engine side surface 29. The outer periphery 30 defines a radialmost surface of the front flange 27 which extends annularly about the front flange 27. The outer periphery 30 joins the hub side surface 28 to the engine side surface 29.

The front flange 27 has a thickness T and a radial outer dimension RD. The thickness T is a maximum thickness which may be measured from the hub side surface 28 to the engine side surface 29 (or vice versa). The thickness T may be uneven, depending on the outline of the surfaces 28, 29 as discussed above, for example. The radial outer dimension RD may correspond to an outer diameter in the embodiments where the front flange 27 has a disc shape, such as shown, or oval shape. The radial outer dimension RD may be measured at the outer periphery 30. The radial outer dimension RD may be a maximum outer dimension of the front flange 27, e.g., where the flange outline and/or outer periphery 30 is irregular or non-circular.

The front flange 27 has a plurality of holes HH extending therethrough. The holes HH extend from the hub side surface 28 to the engine side surface 29. In the embodiment shown, the holes HH are circumferentially spaced apart from each other in the front flange 27. These holes HH may receive fasteners for removably coupling the front flange 27 to the propeller hub 18. The front flange 27 and the propeller hub 18 could be coupled in other suitable manner, such as via male-female connections, interlocking features, threads, lock rings, keying features, for example.

The front flange 27 has a base 31 which merges with the outer surface 26 of the shaft 22. The base 31 may be referred to as a transition area between the front flange 27 and the outer surface 26. The base 31 of the front flange 27 is located on an engine side 29S of the front flange 27 opposite a hub side 28S of the front flange 27. The base 31, or transition area, may extend axially between the engine side surface 29 of the front flange 27 and the outer surface 26 of the shaft 22. The base 31, or transition area, may be defined as shaft wall section having a progressively reducing wall thickness from the outer periphery 30 and/or radialmost surface of the front flange 27 to the outer surface 26 of the shaft 22. In an embodiment, the base 31 defines a fillet having a radius R1. Stated otherwise, a fillet is defined between the front flange 27 and the outer surface 26 of the shaft 22. As shown, the fillet defined by the base 31 faces outwardly away from the central axis X. In an embodiment, the radius R1 is constant over the entire axial dimension of the fillet. The radius R1 could vary along a cord length of the fillet. The base 31 could define a chamfer, in other embodiments. A progressively reducing radial thickness of the shaft wall at the base 31 of the front flange 27 may limit stress amplitude and concentration in such transition area between the front flange 27 and the outer surface 26. It may also facilitate the manufacturing, depending on the manufacturing technique used (e.g., machining, casting, molding), in contrast with a right-angled corner, for example. Even with such progressively reducing radial thickness of the shaft wall at the base 31 of the front flange 27, high stress amplitudes may still exist in such transition area during operation because of the loads e.g., bending moments, imparted by the rotating propeller 16. In operation, airplane maneuvers, aerodynamic and gyroscopic loads transmitted to the front flange 27 via the rotating propeller 16 may cause cyclic stresses and/or loadings in such transition area, which receives a substantial proportion, if not all, of the loads produced by the rotating propeller 16. Stress concentration in such area, with high stress amplitudes, may affect the service life of the shaft 22, hence the engine 10 over time. For engine certification purposes, including compliance with damage tolerance regulations, for example, improvements over previous designs of propeller shaft assemblies may be sought in response to the evolving requirements specification and increasing performance needs of the engine 10. However, various cumulative design constraints may be involved, such as proximity with other parts in the engine 10, various interfaces with such parts, limited space, tight tolerances for part assemblies, and weight control.

Figure 3A:
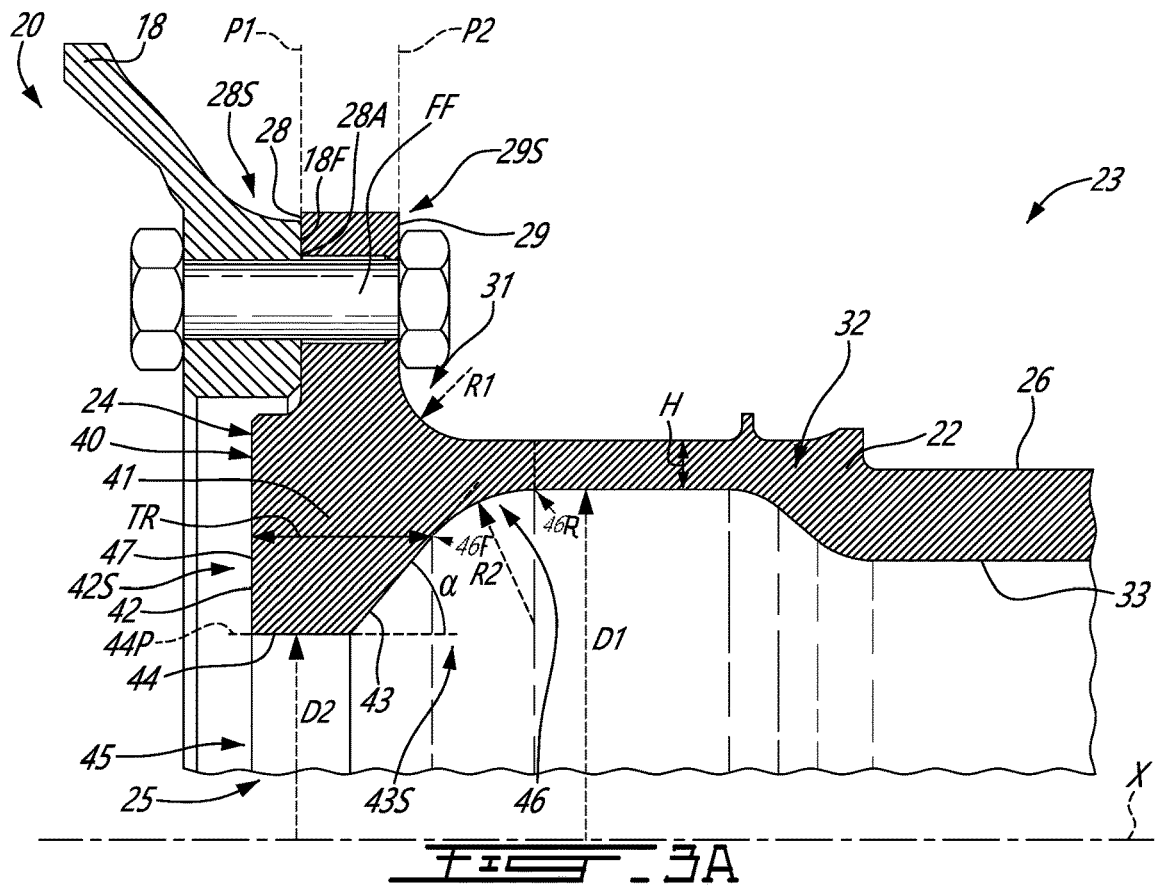
FIG. 3A is a partial cross-sectional view of the portion of the shaft of FIGS. 2A-2B and a propeller hub mounted to the shaft, according to an embodiment.
Figure 3B:
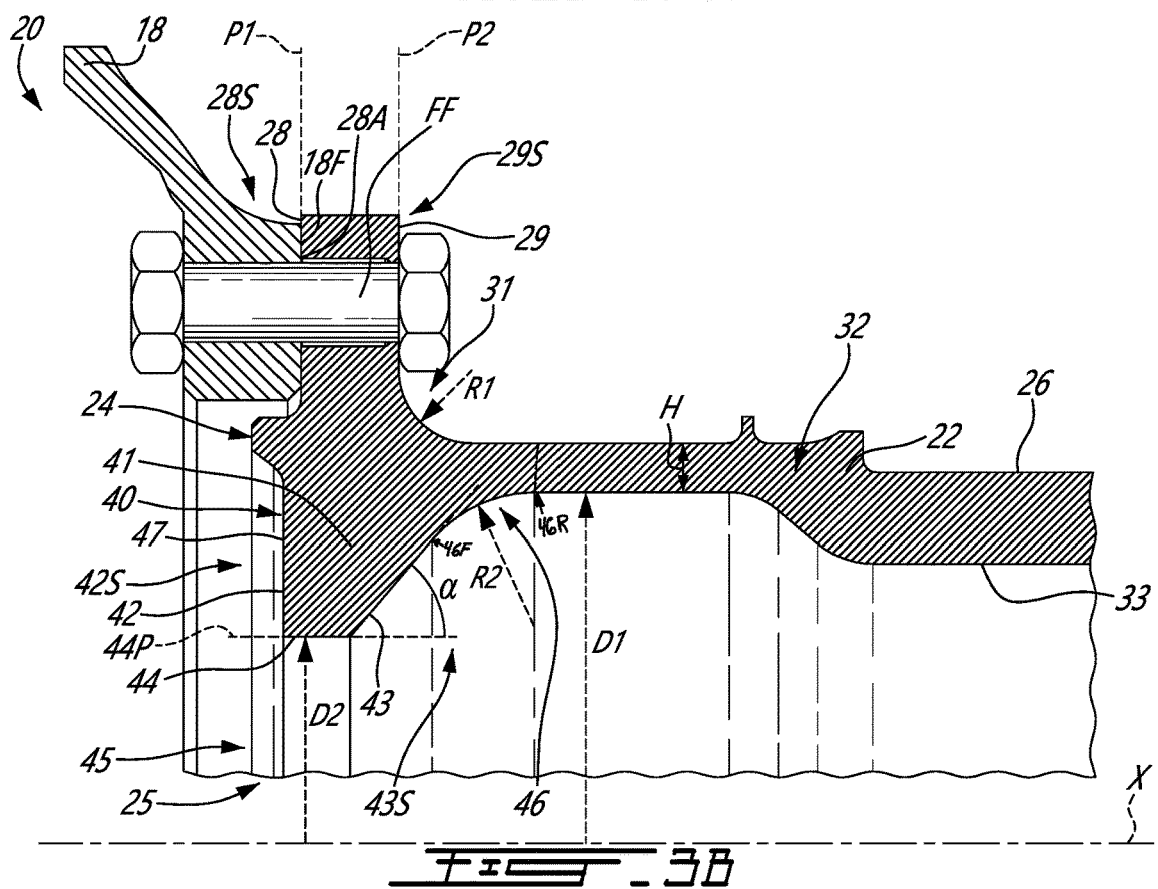
FIG. 3B is a partial cross-sectional view of the portion of the shaft of FIGS. 2A-2B and a propeller hub mounted to the shaft, according to another embodiment.
Figure 3C:
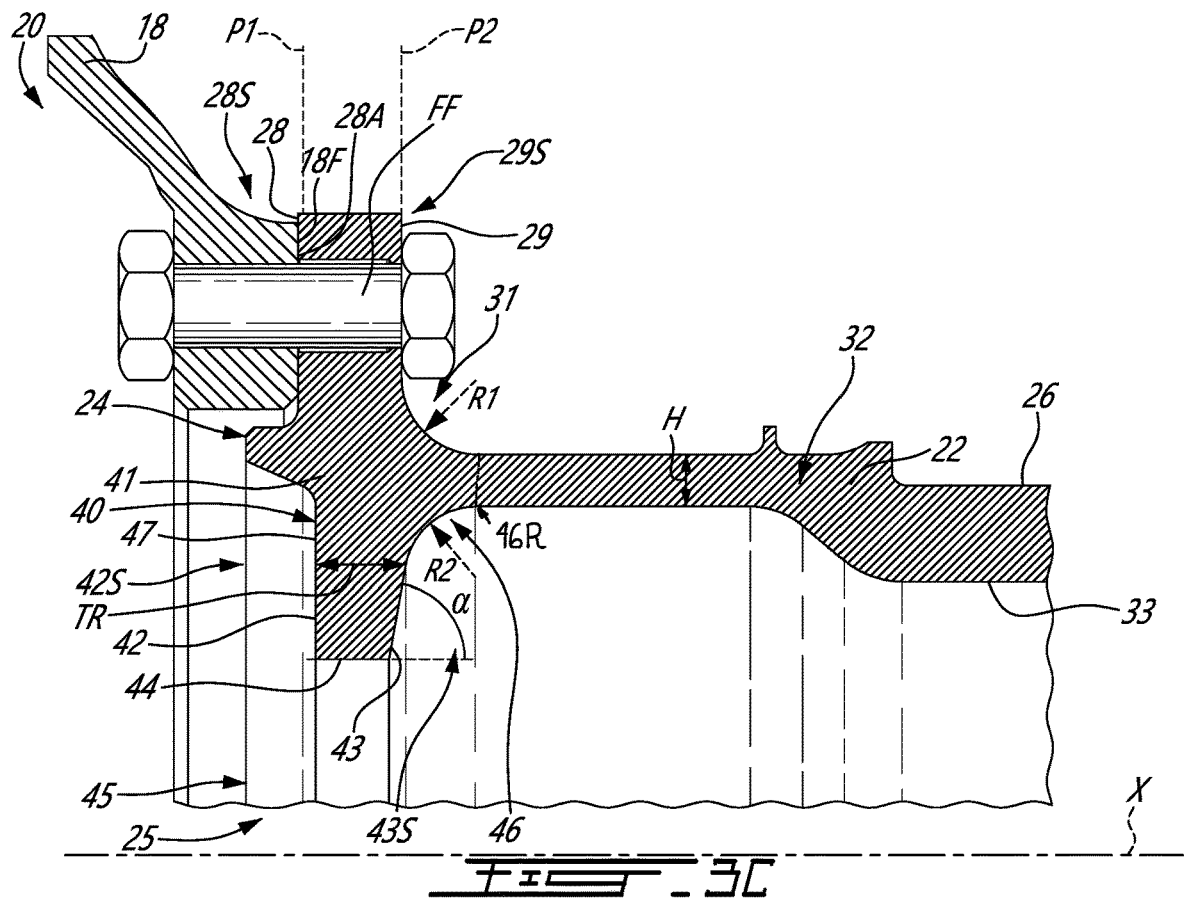
FIG. 3C is a partial cross-sectional view of the portion of the shaft of FIGS. 2A-2B and a propeller hub mounted to the shaft, according to yet another embodiment.

Referring to FIGS. 3A to 3C, various embodiments of the propeller shaft assembly 20 of the present disclosure which address the above concerns will be presented. As further described later with reference to FIGS. 3A to 3C, the shaft 22 a reinforcement rib 40 extending radially inwardly towards the central axis X.

FIG. 3A illustrates a front end portion 23 of the shaft 22 of the propeller shaft assembly 20. The propeller hub 18 is removably coupled to the front flange 27 of the shaft 22 via a plurality of fasteners FF. The propeller hub 18 has a flange engaging surface 18F axially engaging the front flange 27 when secured to the front flange 27. The hub interface 28A of the front flange 27 abuts against the propeller hub 18. The propeller hub 18 and the front flange 27 have complementary surfaces for mating engagement. In the embodiment shown, the complementary surfaces of the propeller hub 18 and the front flange 27 are flat surfaces. Other surface outlines may be contemplated for the hub side surface 28 as described above, so is for the flange engaging surface 18F of the propeller hub 18 interfacing therewith by mating engagement.

In FIG. 3A, half of the shaft 22 is shown in a cross-section. It should be understood that the other half of the shaft 22 may be mirrored on opposite side of the shaft axis X. As shown, the front end portion 23 of the shaft 22 is hollowed from the front end 24. The shaft 22 has a shaft annular wall 32. The shaft annular wall 32 has an inner surface 33 facing inwardly to the bore 25. The inner surface 33 is spaced apart, radially, from the outer surface 26. The inner surface 33 extends from the front end 24 of the shaft 22. The inner surface 33 may extend all the way through the shaft 22, however this is optional.

In at least some embodiments, such as shown, the shaft annular wall 32 has a section of constant (±5%) thickness H on an engine side (opposite the hub side) of the front flange 27. Such section may be referred to as a barrel section of the shaft 22. The barrel section is a section of the shaft 22 that extends adjacent from the base 31 (or end of the fillet). Such location is identified with a dotted line for visual reference. The barrel section may also be referred to as a cylindrical portion of the shaft 22. The axial extent of such barrel section/cylindrical portion of the shaft 22 may be measured from a point where the thickness of the shaft 22 becomes constant, adjacent the end of the base 31 (or fillet) of the front flange 27. Such barrel section/cylindrical portion of the shaft 22 may be absent in other embodiments, where, for instance, that section of the shaft 22 extending from the end of the base 31 (or fillet) may have a transient thickness, with a frustoconical or other non-cylindrical geometry.

The shaft 22 of the propeller shaft assembly 20 includes a reinforcement rib 40 which extends radially inwardly towards the central axis X of the shaft 22. The reinforcement rib 40 may be referred to as an internal rib of the shaft 22, referring to the location of the reinforcement rib 40. Indeed, the reinforcement rib 40 extends radially inwardly on a bore side of the annular wall 32 of the shaft 22. The reinforcement rib 40 extends circumferentially about the central axis X. The reinforcement rib 40 is circumferentially continuous, so as to form a continuous ring/cylindrical shape. The reinforcement rib 40 could be discontinuous along its circumference in some variants (e.g., slotted).

The reinforcement rib 40 defines a localised zone of increased shaft wall thickness in an area where the shaft annular wall 32 is the most solicited by the bending moments imparted by the rotating propeller 16 (FIG. 1) during operation of the engine 10. The reinforcement rib 40 may locally increase the stiffness of the shaft 22 and/or may allow a better stress distribution within the shaft annular wall 32 at the front flange 27. As shown, at least part of the reinforcement rib 40 is radially aligned with the front flange 27 (that is, a radially extending axis normal to the central axis X would pass through at least part of the reinforcement rib 40 and the front flange 27 at a given point along the central axis X).

In at least some embodiments, such as shown, the reinforcement rib 40 has an axial thickness TR along the central axis X of the shaft 22 that decreases in a radially inward direction towards the central axis X. This may limit the added weight contribution of the reinforcement rib 40, when compared to shafts that would not have such reinforcement rib 40. In some variants, the reinforcement rib 40 could have a constant thickness T in the radially inward direction.

The reinforcement rib 40 has an annular wall 41 having a hub side surface 42 and an engine side surface 43 opposite the hub side surface 42. An annular surface 44 extends between the hub side surface 42 and the engine side surface 43. In at least some embodiments, junctions between the annular surface 44 and respective ones of the hub side surface 42 and the engine side surface 43 are defined by edges. However, a transition between the annular surface 44 and either one or both of the hub side surface 42 and the engine side surface 43 may be rounded. As such, these surfaces 42, 43, 44 may merge smoothly, without any precise delimitation. In at least some embodiments, the annular surface 44 may be flat but, curved or uneven outlines could also be contemplated. For instance, in FIG. 3A, the annular surface 44 is flat. The annular surface 44, whether flat, curved, or other outline, may define a radially inwardmost point of the shaft 22 in the front end portion 23 thereof.

As shown, the annular surface 44 faces towards the central axis X, between the hub side surface 42 and the engine side surface 43 of the reinforcement rib 40. As shown, the annular surface 44 may delimit a central opening 45 of the shaft 22. The central opening 45 may allow a fluid flow communication between the bore 25 and the propeller hub 18. As discussed above, in at least some cases, pressurized oil, or other fluid, may be supplied to propeller control systems/units and/or blade actuators, via the bore 25.

The central opening 45 is represented having a diameter D2. The diameter D2 of the central opening 45 may define the smallest diameter of the bore 25 (i.e., smallest at least in the front end portion 23 of the shaft 22). In at least some embodiments, the bore 25 of the shaft 22 has a maximum diameter D1 in a shaft section adjacent the reinforcement rib 40. Such shaft section may correspond to the barrel section/cylindrical portion of the shaft 22 (described above), on an engine side of the front flange 27 (i.e., opposite a hub side of the front flange 27). In at least some embodiments, a ratio of the diameter D2 over the diameter D1 has a value between 0.1 and 0.9. Such proportion may provide a good balance between added stiffness and stress distribution, versus added weight due to the presence of the reinforcement rib 40. However, this only encompasses some possibilities, as other ratios outside this range could be contemplated.

In at least some embodiments, the engine side surface 43 extends angularly with respect to the central axis X. The engine side surface 43 of the reinforcement rib 40 extends at an angle α, which may range from at least 10 degrees to at most 90 degrees. The angle α may be measured relative to the central axis X and/or a plane 44P extending parallel to the central axis X and containing the annular surface 44, as in FIG. 3A.

In at least some embodiments, such as shown in FIG. 3A (and FIG. 3B which will be further described later), the engine side surface 43 of the reinforcement rib 40 intersects with the plane P2 containing the engine side surface 29 of the front flange 27. The engine side surface 43 of the reinforcement rib 40 may extend axially beyond the engine side surface 29 of the front flange 27 in a direction extending away from the front end 24 of the shaft 22 along the central axis X.

The reinforcement rib 40, or at least part thereof, is aligned radially with respect to the front flange 27, when viewed along the central axis X. In FIG. 3A, such a position could be referred to as "underneath" the front flange 27. Stated otherwise, the front flange 27 and the reinforcement rib 40 may be intersected by a plane, e.g., plane P1, plane P2 or another plane between P1 and P2, normal to a vector aligned with the central axis X of the shaft 22.

In at least some embodiments, the reinforcement rib 40 defines a fillet 46 facing inwardly towards the central axis X. The fillet 46 is located on an engine side 43S of the reinforcement rib 40 opposite a hub side 42S of the reinforcement rib. The fillet 46 extends from, or is part of, the engine side surface 43 of the reinforcement rib 40. The fillet 46 of the reinforcement rib 40 extends axially along the central axis X from a front fillet end 46F to a rear fillet end 46R. In at least some embodiments, the rear fillet end 46R is axially offset from that of the base 31 (e.g., fillet when present), of the front flange 27. As such, the thickness H of the annular wall 32 of the shaft 22 at a location coinciding with the end of the base 31 of the front flange does not correspond to the minimum thickness of the shaft 22 in the front end portion 23.

The fillet 46 has a radius R2. The radius R2 may be constant over the entire axial dimension of the fillet 46 and/or the cord length thereof. The radius R2 could vary along a cord length of the fillet 46 in other embodiments. In at least some embodiments, where the base 31 of the front flange 27 defines a fillet, the radius R1 of the fillet of the base 31 may be smaller than the radius R2 of the fillet 46 of the reinforcement rib 40. However, this is optional, since R1 could be larger than R2. In at least some embodiments, a ratio of the radius R2 of the fillet 46 over the radius R1 of the fillet defined by the base 31 of the front flange 27 has a value of at least 0.2 and at most 3.0.

With continued reference to FIG. 3A, the reinforcement rib 40 has a front surface 47. The front surface 47 is an annular front surface. The front surface 47 fases in a direction opposite that of the engine side surface 29 of the front flange 27. In an embodiment, such as shown in FIG. 3A, the front surface 47 of the reinforcement rib 40 defines the front end 24 of the shaft 22. Stated otherwise, the front surface 47 of the reinforcement rib 40 is a forwardmost surface of the shaft 22. As will be described further herein with respect to other figures, this is only one possibility.

FIG. 3B illustrates another embodiment of the propeller shaft assembly 20. Like features as those already described above with respect to the other embodiments have the same reference numbers for simplicity and will not be repeatedly described herein for conciseness. As in FIG. 3A, half of the shaft 22 is shown in a cross-section. It should be understood that the other half of the shaft 22 may be mirrored on opposite side of the shaft axis X. In FIG. 3B, the reinforcement rib 40 has its front surface 47 facing in a direction opposite that of the engine side surface 29 of the front flange 27, as in FIG. 3A. However, in FIG. 3B, the annular front surface 47 is axially offset from the front end 24 of the shaft 22 along the central axis X. Stated otherwise, a recess is defined at the front end 24 of the shaft 22, with such recess extending from the front end 24 of the shaft 22 to the front surface 47 of the reinforcement rib 40. In at least some embodiments, as shown in FIG. 3B, the annular front surface 47 of the reinforcement rib 40 is axially offset with respect to the hub side surface 28 of the front flange 27 along the central axis X. The annular front surface 47 of the reinforcement rib 40 may be closer from the front end 24 of the shaft 22 than the hub side surface 28 is from the front end 24 of the shaft 22, as in FIG. 3B. Other configurations may be contemplated, as described hereinafter with respect to FIG. 3C.

FIG. 3C illustrates another embodiment of the propeller shaft assembly 20. Like features as those already described above with respect to the other embodiments have the same reference numbers for simplicity and will not be repeatedly described herein for conciseness. As in FIG. 3A, half of the shaft 22 is shown in a cross-section. It should be understood that the other half of the shaft 22 may be mirrored on opposite side of the shaft axis X. In FIG. 3C, similarly as in FIG. 3B, the annular front surface 47 of the reinforcement rib 40 is axially offset from the front end 24 of the shaft 22 along the central axis X. In an embodiment, such as shown in FIG. 3C, the hub side surface 28 of the front flange 27 is closer from the front end 24 of the shaft 22 than the front annular surface 47 of the reinforcement is from the front end 24 of the shaft 22. As shown in FIG. 3C, the axial thickness TR of the reinforcement rib 40 is smaller than that shown in FIGS. 3A-3B. The angle α is also closer than 90 degrees than the angle α of the engine side surface 43 of the reinforcement rib 40 shown in FIGS. 3A-3B. In FIG. 3C a weight of the material forming part of the reinforcement rib 40 is smaller than that of the embodiments shown in FIGS. 3A-3B. In at least some embodiments, such as shown in FIG. 3C, at least part of the fillet 46 of the reinforcement rib 40 is radially aligned with the base 31 (e.g., fillet when present) of the front flange 27 along the central axis X. The fillet 46 of the reinforcement rib 40 not aligned radially with the base 31 may be contemplated in other embodiments.

Figure 4:
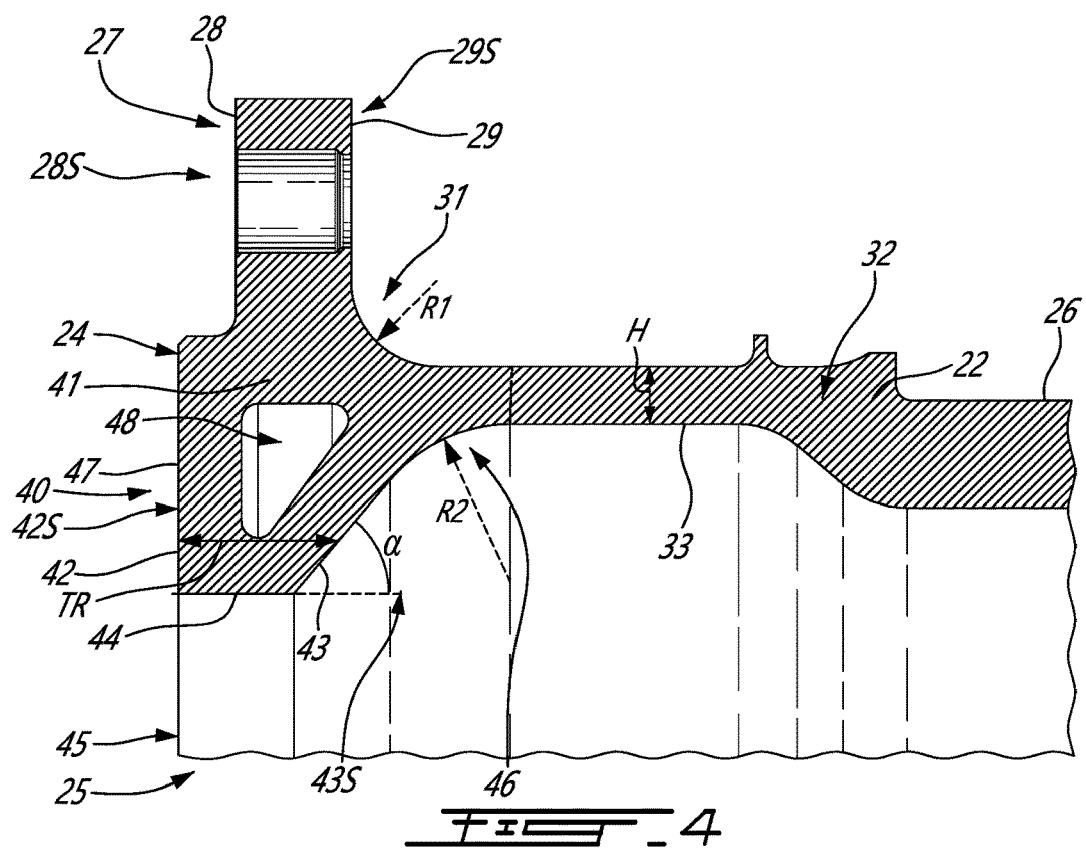
FIG. 4 is a magnified view of a partial cross-sectional view of the portion of the shaft of FIGS. 2A-2B as in FIG. 3A, according to an alternate embodiment.

In a variant of the propeller shaft assembly 20 discussed hereinabove, and referring to FIG. 4, other ways to reduce the weight of the reinforcement rib 40 may be contemplated. For example, in the variant shown in FIG. 4, the reinforcement rib 40, which extends annularly about the central axis X as in FIGS. 3A-3C, has a hollowed interior 48 radially between the annular surface 44 delimiting the central opening 45 and the front flange 27. The hollowed interior 48 may extend continuously along a full circumference of the reinforcement rib 40, along the central axis X.

According to the embodiments described hereinabove, a propeller shaft (22) for a propeller shaft assembly (20) of an aircraft engine (10) may be provided, with a bore (25) extending through the shaft (22) from a front end (24) thereof. The shaft (22) has an annular wall (32) extending about the bore (25). The annular wall has an outer surface (26) which faces radially outwardly from the shaft (22). The shaft (22) has an inner surface (32) which faces radially inwardly to the bore (25) and which is spaced apart from the outer surface (26). The shaft (22) has a front flange (27) which projects radially outwardly away from the bore (25). The front flange (27) has a hub side surface (28) and an engine side surface (29) opposite the hub side surface (28) and axially spaced apart therefrom. The hub side surface (28) of the front flange (27) defines an interface plane, or hub interface (28A) and is adapted to abut with a propeller hub (18) of the propeller shaft assembly (20). In order to reinforce the shaft (22) and/or its front flange (27), a rib (40) extends radially inwardly towards a central axis of the shaft. The rib (40) is located relative to the front flange (27) such that at least part of the rib (40) is radially aligned with the front flange (27) along the central axis.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, while an airborne turboprop engine 10 is shown in FIG. 1, it is to be understood that the present disclosure could apply to other types of aircraft engines, including for example turboshaft engines. Yet further modifications could be implemented by a person of ordinary skill in the art in view of the present disclosure, which modifications would be within the scope of the present technology.

The invention claimed is:

1. A propeller shaft assembly for an aircraft engine, comprising:
   a shaft having a wall, and a bore extending through the shaft at a front end thereof, the front end of the shaft having an outer surface facing radially outwardly from the shaft and an inner surface spaced apart from the outer surface and facing radially inwardly to the bore;
   a front flange of the wall extending radially outwardly on the outer surface, the front flange defining a hub side surface and an engine side surface opposite the hub side surface and axially spaced apart therefrom, the hub side surface of the front flange adapted to abut with a propeller hub, the front flange having a base merging with the outer surface of the shaft; and
   a reinforcement rib of the wall extending radially inwardly towards a central axis of the shaft, wherein at least part of the reinforcement rib is radially aligned with the front flange, and the reinforcement rib defines a fillet facing inwardly towards the central axis, the fillet located on an engine side of the reinforcement rib opposite a hub side of the reinforcement rib, the front flange defines a fillet facing outwardly away from the central axis, the fillet of the front flange located on an engine side of the front flange opposite a hub side of the front flange wherein the reinforcement rib has an annular surface facing towards the central axis, the annular surface delimiting a central opening of the shaft, the central opening having a diameter D2, the bore of the shaft having a maximum diameter D1 in a shaft section adjacent the reinforcement rib, the shaft section located on the engine side of the front flange opposite the hub side of the front flange, a ratio of D2 over D1 having a value between 0.1 and 0.9.

2. The propeller shaft assembly as defined in claim 1, wherein the fillet of the reinforcement rib extends axially along the central axis from a front fillet end to a rear fillet end, the rear fillet end axially offset from that of the fillet of the front flange.

3. The propeller shaft assembly as defined in claim 1, wherein the fillet of the reinforcement rib has a radius R2 and the fillet of the front flange has a radius R1, a ratio of R2 over R1 having a value of at least 0.2 and at most 3.0.

4. The propeller shaft assembly as defined in claim 1, wherein at least part of the fillet of the reinforcement rib is radially aligned with the fillet of the front flange along the central axis.

5. The propeller shaft assembly as defined in claim 1, wherein the reinforcement rib has an annular wall having a hub side surface and an engine side surface opposite the hub side surface, the annular surface facing towards the central axis between the hub side surface and the engine side surface of the reinforcement rib, the engine side surface extending from the central opening, angularly with respect to the central axis.

6. The propeller shaft assembly as defined in claim 5, wherein the engine side surface of the reinforcement rib extends at an angle α with respect to the central axis, the angle α being at least 10 degrees and at most 90 degrees.

7. The propeller shaft assembly as defined in claim 5, wherein the engine side surface of the reinforcement rib intersects with a plane containing the engine side surface of the front flange.

8. The propeller shaft assembly as defined in claim 5, wherein the engine side surface of the reinforcement rib extends axially beyond the engine side surface in a direction extending away from the front end of the shaft along the central axis.

9. The propeller shaft assembly as defined in claim 1, wherein the reinforcement rib defines an annular front surface facing in a direction opposite that of the engine side surface of the front flange, the annular front surface axially offset from the front end of the shaft along the central axis.

10. The propeller shaft assembly as defined in claim 9, wherein the annular front surface of the reinforcement rib is axially offset with respect to the hub side surface of the front flange along the central axis, the annular front surface of the reinforcement rib closer from the front end of the shaft than the hub side surface is from the front end of the shaft.

11. The propeller shaft assembly as defined in claim 9, wherein the annular front surface of the reinforcement rib is axially offset with respect to the hub side surface of the front flange along the central axis, the hub side surface of the front flange closer from the front end of the shaft than the front annular surface of the reinforcement rib is from the front end of the shaft.

12. The propeller shaft assembly as defined in claim 1, wherein the reinforcement rib having a hollowed interior radially between the annular surface and the front flange.

13. The propeller shaft assembly as defined in claim 1, further comprising the propeller hub removably secured to the front flange, the propeller hub having a flange engaging surface axially engaging the hub side surface of the front flange when secured to the front flange.

14. A propeller shaft assembly for an aircraft engine, comprising:

a shaft having a wall, and a bore extending through the shaft at a front end thereof, the front end of the shaft having an outer surface facing radially outwardly from the shaft and an inner surface spaced apart from the outer surface and facing radially inwardly to the bore;

a front flange of the wall extending radially outwardly on the outer surface, the front flange defining a hub side surface and an engine side surface opposite the hub side surface and axially spaced apart therefrom, the hub side surface of the front flange adapted to abut with a propeller hub, the front flange having a base merging with the outer surface of the shaft; and a reinforcement rib of the wall extending radially inwardly towards a central axis of the shaft, wherein at least part of the reinforcement rib is radially aligned with the front flange, and the reinforcement rib defines a fillet facing inwardly towards the central axis, the fillet located on an engine side of the reinforcement rib opposite a hub side of the reinforcement rib, the front flange defines a fillet facing outwardly away from the central axis, the fillet of the front flange located on an engine side of the front flange opposite a hub side of the front flange, wherein the reinforcement rib has an annular wall having a hub side surface and an engine side surface opposite the hub side surface, an annular surface facing towards the central axis between the hub side surface and the engine side surface of the reinforcement rib, the annular surface delimiting a central opening of the shaft, the engine side surface extending from the central opening, angularly with respect to the central axis.

15. The propeller shaft assembly as defined in claim 14, wherein the engine side surface of the reinforcement rib extends at an angle α with respect to the central axis, the angle α being at least 10 degrees and at most 90 degrees.

16. The propeller shaft assembly as defined in claim 14, wherein the engine side surface of the reinforcement rib intersects with a plane containing the engine side surface of the front flange.

17. The propeller shaft assembly as defined in claim 14, wherein the engine side surface of the reinforcement rib extends axially beyond the engine side surface in a direction extending away from the front end of the shaft along the central axis.

18. The propeller shaft assembly as defined in claim 14, wherein the reinforcement rib defines an annular front surface facing in a direction opposite that of the engine side surface of the front flange, the annular front surface axially offset from the front end of the shaft along the central axis.

19. The propeller shaft assembly as defined in claim 14, wherein the fillet of the reinforcement rib extends axially along the central axis from a front fillet end to a rear fillet end, the rear fillet end axially offset from that of the fillet of the front flange.

20. The propeller shaft assembly as defined in claim 14, wherein the fillet of the reinforcement rib has a radius R2 and the fillet of the front flange has a radius R1, a ratio of R2 over R1 having a value of at least 0.2 and at most 3.0.

21. A propeller shaft assembly for an aircraft engine, comprising:

a shaft having a wall, and a bore extending through the shaft at a front end thereof, the front end of the shaft having an outer surface facing radially outwardly from the shaft and an inner surface spaced apart from the outer surface and facing radially inwardly to the bore;

a front flange of the wall extending radially outwardly on the outer surface, the front flange defining a hub side surface and an engine side surface opposite the hub side surface and axially spaced apart therefrom, the hub side surface of the front flange adapted to abut with a propeller hub, the front flange having a base merging with the outer surface of the shaft; and a reinforcement rib of the wall extending radially inwardly towards a central axis of the shaft, wherein at least part of the reinforcement rib is radially aligned with the front flange, and the reinforcement rib defines a fillet facing inwardly towards the central axis, the fillet located on an engine side of the reinforcement rib opposite a hub side of the reinforcement rib, the front flange defines a fillet facing outwardly away from the central axis, the fillet of the front flange located on an engine side of the front flange opposite a hub side of the front flange, wherein the reinforcement rib defines an annular front surface facing in a direction opposite that of the engine side surface of the front flange, the annular front surface axially offset from the front end of the shaft along the central axis, and, wherein the annular front surface of the reinforcement rib is axially offset with respect to the hub side surface of the front flange along the central axis, the hub side surface of the front flange closer from the front end of the shaft than the front annular surface of the reinforcement rib is from the front end of the shaft.

22. The propeller shaft assembly as defined in claim 21, wherein the fillet of the reinforcement rib extends axially along the central axis from a front fillet end to a rear fillet end, the rear fillet end axially offset from that of the fillet of the front flange.

23. The propeller shaft assembly as defined in claim 21, wherein the fillet of the reinforcement rib has a radius R2 and the fillet of the front flange has a radius R1, a ratio of R2 over R1 having a value of at least 0.2 and at most 3.0.

* * * * *